United States Patent [19]

Mine et al.

[11] Patent Number: 5,015,159
[45] Date of Patent: May 14, 1991

[54] FUEL PUMP

[75] Inventors: Koichi Mine; Hikaru Kikuta; Hitoshi Takeuchi; Kingo Kamiya, all of Obu, Japan

[73] Assignee: Aisan Kogyo Kabushiki Kaisha, Obu, Japan

[21] Appl. No.: 524,426

[22] Filed: May 17, 1990

[30] Foreign Application Priority Data

Jun. 1, 1989 [JP] Japan ............................. 1-64157[U]
Apr. 9, 1990 [JP] Japan ............................. 2-37734[U]

[51] Int. Cl.$^5$ ............................................. F04B 35/04
[52] U.S. Cl. .................................. 417/366; 417/423.7; 417/902; 123/499; 123/41.31; 310/87
[58] Field of Search ................. 417/366, 423.3, 423.5, 417/423.7, 424.1, 902; 123/497, 499, 41.31; 310/51, 87

[56] References Cited

U.S. PATENT DOCUMENTS

| | | | |
|---|---|---|---|
| 3,188,968 | 6/1965 | McMahan | 310/87 X |
| 3,196,301 | 7/1965 | Turk | 310/87 X |
| 3,870,910 | 3/1975 | Fussner | 417/423.7 X |
| 3,873,861 | 3/1975 | Halm | 310/87 X |
| 4,374,337 | 2/1983 | Kohzai et al. | 310/51 X |
| 4,492,889 | 1/1985 | Fukushi et al. | 310/87 |
| 4,496,866 | 1/1985 | Yamamoto et al. | 310/87 |
| 4,651,039 | 3/1987 | Yamamoto et al. | 310/87 |
| 4,652,218 | 3/1987 | Tsutsui et al. | 417/368 |
| 4,749,894 | 6/1988 | Iwata et al. | 310/87 |
| 4,780,953 | 11/1988 | Wheeler et al. | 310/87 X |

FOREIGN PATENT DOCUMENTS 35-17264 11/1960 Japan .
59-169339 9/1984 Japan ..................................... 310/51
61-96758 6/1986 Japan .

Primary Examiner—Leonard E. Smith
Assistant Examiner—Eugene L. Szczecina, Jr.
Attorney, Agent, or Firm—Dennison, Meserole, Pollack & Scheiner

[57] ABSTRACT

A fuel pump including a housing; a motor section provided in the housing which motor section includes an armature and a magnet opposed to the armature with a substantially annular space defined therebetween as a fuel passage, which armature includes a core formed by stacking a plurality of plates and a coil wound around the core; a pump section fixed to a lower end of the housing and connected to the motor section to be driven thereby; a fuel inlet formed in the pump section for sucking a fuel by driving the motor section; a fuel outlet formed at an upper end of the fuel pump for discharging the fuel fed from the fuel inlet through the fuel passage; and a first resin portion impregnated in the core and the coil for suppressing vibration of the armature. The fuel pump having the above construction preferably further includes a second resin portion coated on a surface of at least the first resin portion, which second resin portion has a resistance against the fuel and no influence upon the fuel.

2 Claims, 10 Drawing Sheets

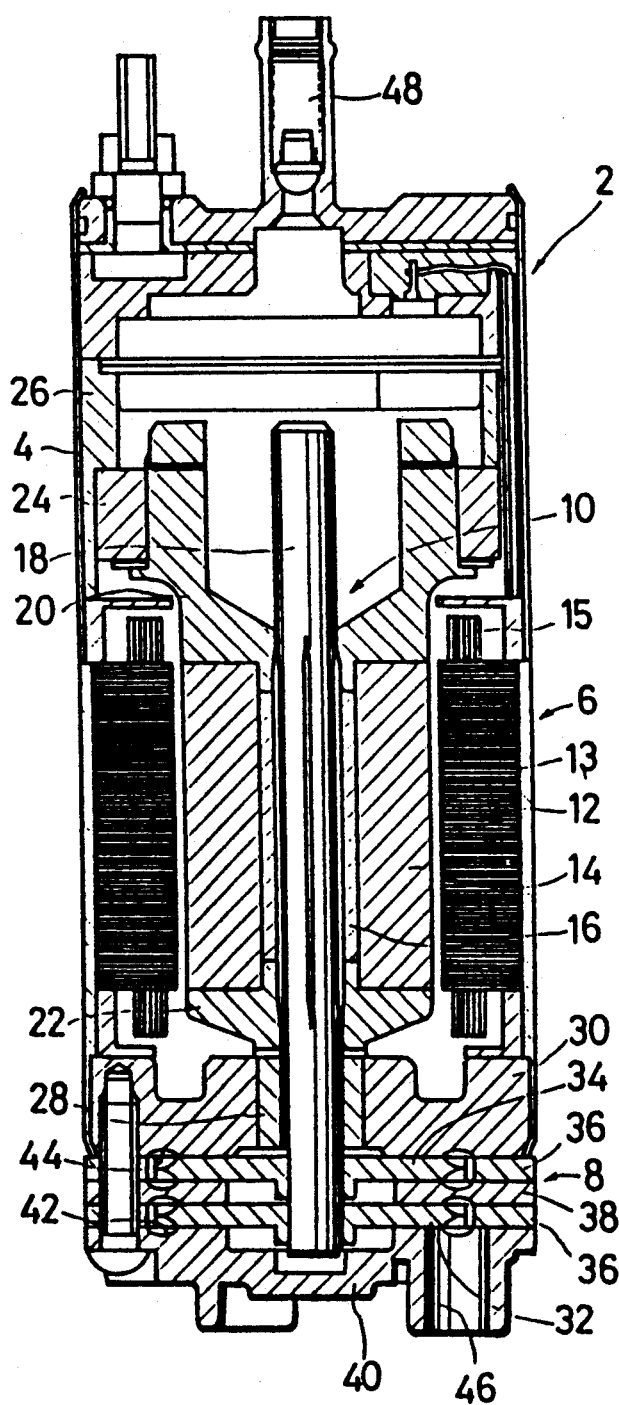
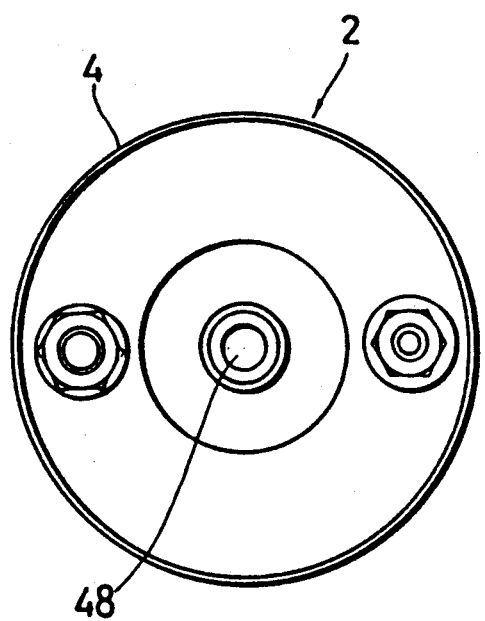
FIG. 17
RELATED ART
FIG. 16
RELATED ART

FUEL PUMP

BACKGROUND OF THE INVENTION

The present invention relates to a fuel pump for primary use with an automobile.

FIGS. 16 and 17 show one example of such a fuel pump in the related art, and FIGS. 18 and 19 show another example of the related art fuel pump.

Referring first to FIGS. 16 and 17 which are a vertical sectional view and a top plan view of the first example of the related art fuel pump, reference numeral 2 generally designates a fuel pump comprising a housing 4, a motor section 6 provided in the housing 4, and a pump section 8 provided at a lower portion of the housing 4.

The motor section 6 is constructed of a brushless motor 10 coaxially installed in the housing 4. The brushless motor 10 includes a fixed type armature 12 and a rotor magnet 14. The armature 12 is fixed to the housing 4, and it comprises a core 13 formed by stacking a plurality of stator plates and a coil 15 wound around the core 13. A motor shaft 18 is mounted through a collar 16 to the rotor magnet 14. A timing rotor 20 formed of a non-magnetic material is engaged with an upper surface of the rotor magnet 14, and a rotor cover 22 formed of a non-magnetic material is engaged with a lower surface of the rotor magnet 14. Thus, the assembly of the timing rotor 20, the rotor cover 22 and the rotor magnet 14 is fixedly mounted on the motor shaft 18. The motor shaft 18 is rotatably supported at its upper portion through the timing rotor 20, a timing rotor bearing 24 and a case holder 26 to the housing 4, while being rotatably supported at its lower portion through a motor shaft bearing 28 and a pump cover 30 forming a component of the pump section 8 to the housing 4.

The pump section 8 includes a pair of impellers 32 and 34 mounted on a lower end portion of the motor shaft 18. The impellers 32 and 34 are located in a space defined by the pump cover 30, a pair of annular spacers 36, a center plate 38 and a housing body 40, so that a pair of sectionally C-shaped pump chambers 42 and 44 are defined around the outer peripheries of the impellers 32 and 34, respectively. The pump chambers 42 and 44 are communicated with each other. The lower pump chamber 42 is communicated through a fuel inlet 46 formed through the housing body 40 to a fuel tank (not shown), while the upper pump chamber 44 is communicated through an outlet port (not shown) to the inside area of the housing 4.

In operation, when the motor section 6 is operated to rotate the impellers 32 and 34, fuel is sucked from the fuel inlet 46 into the pump chambers 42 and 44. The fuel sucked into the pump chambers 42 and 44 is pumped up through the outlet port into the housing 4. Then, the fuel is fed through an annular fuel passage defined between the armature 12 and the rotor magnet 14 to a fuel outlet 48 formed at an upper end of the fuel pump 2.

Referring next to FIGS. 18 and 19 which are a vertical sectional view and a top plan view of the second example of the related art fuel pump, the fuel pump has the same construction as that of the first example shown in FIGS. 16 and 17 except the construction of the motor section 6, the same reference numerals designate the same or corresponding parts, and accordingly the following description will be directed to the motor section 6 only.

The motor section 6 is constructed of a brush motor 110 coaxially installed in the housing 4. The motor 110 includes a rotary type armature 112 and a magnet 114 fixed to the housing 4. The armature 112 comprises a core 113 formed by stacking a plurality of plates and a coil 115 wound around the core 113. The motor shaft 18 is mounted at a central portion of the armature 112. A commutator 116 is mounted on an upper portion of the motor shaft 18, and it slidably contacts a brush 120 mounted through a brush holder 118 to the housing 4. The motor shaft 18 is rotatably supported at its upper end portion through a bearing 122 and a cover 124 to the housing 4, while being supported at its lower end portion through the motor shaft bearing 28 and the pump cover 30 to the housing 4.

As the prior art of the present invention, there are disclosed in Japanese Utility Model Laid-open Publication No. 61-96758 and Japanese Patent Publications No. 35-17264 a brush motor having an armature entirely covered with an adhesive layer having a substantially circular cross section.

In the above-mentioned related art as shown in FIGS. 16 to 19, there is a problem of noise due to vibration. Specifically, in the related art as shown in FIGS. 16 and 17, a high-frequency wave near 1 kHz is generated due to a fluctuation in electromagnetic force generated in the armature, and causes the vibration of the armature itself. The vibration of the armature is transmitted to the housing, causing vibration of the housing to generate the noise. A frequency (f) of the noise to be generated due to the fluctuation of the electromagnetic force is expressed as follows:

f = (rotating speed (r.p.m.) of the rotor magnet) x (the number of times of excitation of the coil per revolution of the rotor magnet) × N/60 (where N is integer.)

On the other hand, in the related art as shown in FIGS. 18 and 19, the vibration of the armature is generated due to the sliding contact between the brush and the commutator or due to the same cause as mentioned above. A frequency (f') of the noise to be generated due to the sliding contact between the brush and the commutator is expressed as follows:

f' = (rotating speed (r.p.m.) of the armature) × (the number of segments of the commutator) × N/60 (where N is integer.)

SUMMARY OF THE INVENTION

It is an object of the present invention to provide a fuel pump which can suppress the vibration of the armature and thereby suppress the vibration of the housing to reduce the noise to be generated from the housing.

According to the present invention, there is provided a fuel pump comprising a housing; a motor section provided in said housing, said motor section comprising an armature and a magnet opposed to said armature with a substantially annular space defined therebetween as a fuel passage, said armature comprising a core formed by stacking a plurality of plates and a coil wound around said core; a pump section fixed to a lower end of said housing and connected to said motor section to be driven thereby; a fuel inlet formed in said pump section for sucking a fuel by driving said motor section; a fuel outlet formed at an upper end of said fuel pump for discharging the fuel fed from said fuel inlet through said fuel passage; and a first resin portion impregnated in said core and said coil for suppressing vibration of said armature.

With this construction, a rigidity of the armature is increased to thereby increase attenuation of the vibration of the armature. As a result, the vibration of the armature itself can be suppressed.

The fuel pump having the above construction preferably further comprises a second resin portion coated on a surface of at least said first resin portion, said second resin portion having a resistance against the fuel and no influence upon the fuel.

With this construction, a durability of the first resin portion can be improved by the second resin portion. As a result, a durability of the fuel pump can be improved.

The invention will be more fully understood from the following detailed description and appended claims when taken with the drawings.

BRIEF DESCRIPTION OF THE DRAWINGS

FIG. 16 is a vertical sectional view of the fuel pump having a brushless motor in the related art;

FIG. 17 is a top plan view of FIG. 16;

DETAILED DESCRIPTION OF THE PREFERRED EMBODIMENTS

Figure 1:
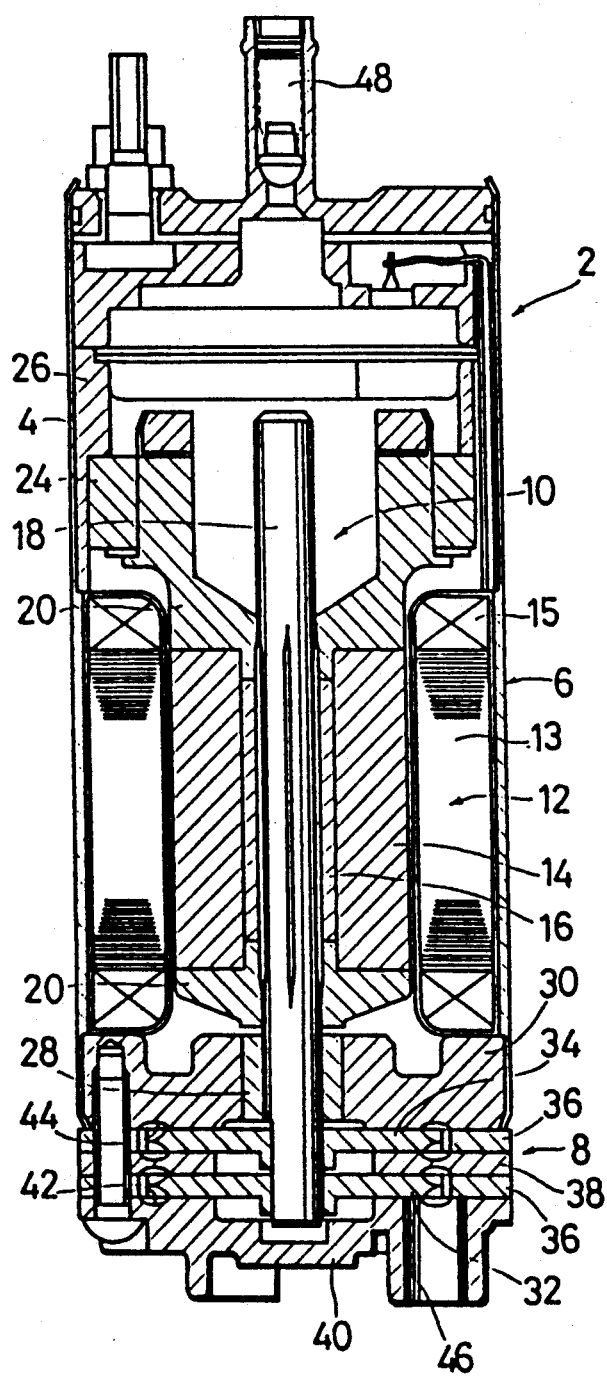
FIG. 1 is a vertical sectional view of the fuel pump according to a first preferred embodiment of the present invention.
Figure 2:
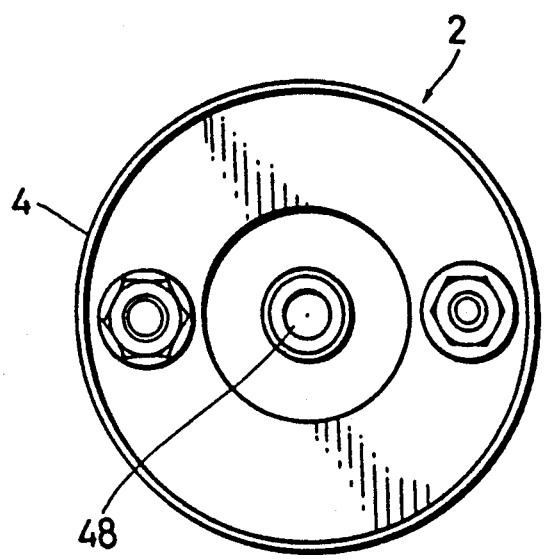
FIG. 2 is a top plan view of FIG. 1.
Figure 3:
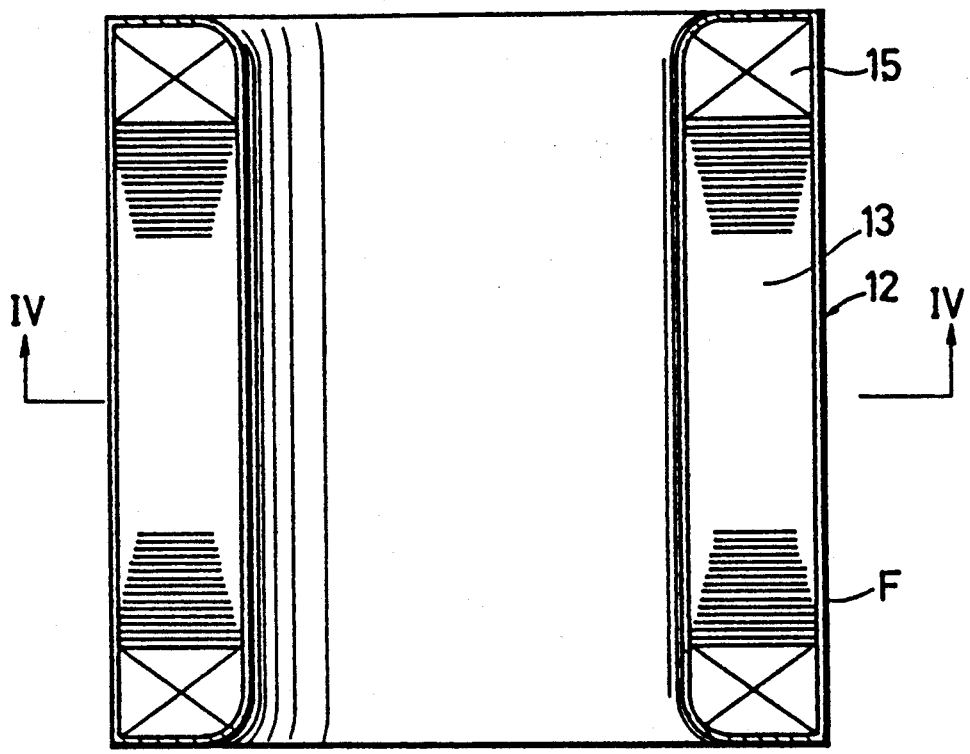
FIG. 3 is an enlarged sectional view of the armature shown in FIG. 1.

There will now be described some preferred embodiments of the present invention with reference to the drawings.

FIGS. 1 to 4 show a first preferred embodiment of the present invention, in which the same reference numerals as those shown in FIGS. 16 and 17 designate the same or corresponding parts, and the following description will be directed to the construction of the armature since the other construction is the same as that shown in FIGS. 16 and 17.

Figure 4:
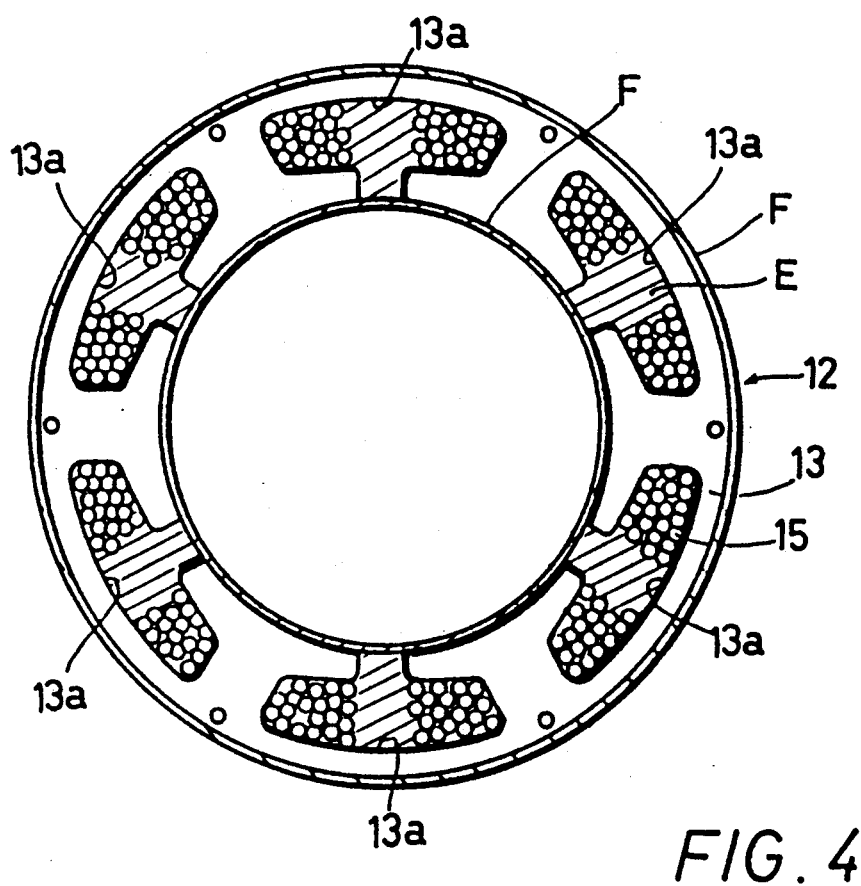
FIG. 4 is a cross section taken along the line IV—IV in FIG. 3.

Referring to FIGS. 1 to 4, the armature 12 of the brushless motor 10 of the fuel pump 2 is constructed of the core 13 having a plurality of poles (e.g., six poles) as formed by stacking a plurality of stator plates (e.g., seventy plates) and the coil 15 wound around the core 13. As shown in FIG. 4, the core 13 is formed with a plurality of recesses 13a for receiving the coil 15, and a first resin portion E formed of epoxy resin capable of suppressing vibration of the armature 12 is impregnated in the core 13 and the coil 15 in such a manner that the first resin portion E is entirely filled in the recesses 13a. Furthermore, a second resin portion F formed of polyacetal resin having a resistance against the fuel and no influence upon the fuel is coated on an entire surface of the armature 12. Alternatively, the second resin portion F may be coated on an exposed surface of the first resin portion E only.

With this construction, a rigidity of the armature 12 is improved by the first resin portion E to thereby suppress the vibration of the armature 12 due to a fluctuation in electromagnetic force. As a result, a noise due to the vibration of the armature 12 is reduced. Furthermore, since the first resin portion E is entirely covered with the second resin portion F having a resistance against the fuel and no influence upon the fuel, there is no possibility that the first resin portion E will be deteriorated by the fuel flowing in the housing 4. Accordingly, a reliability of the armature 12 can be improved to lead to an improvement in reliability of the fuel pump 2.

Figure 5:
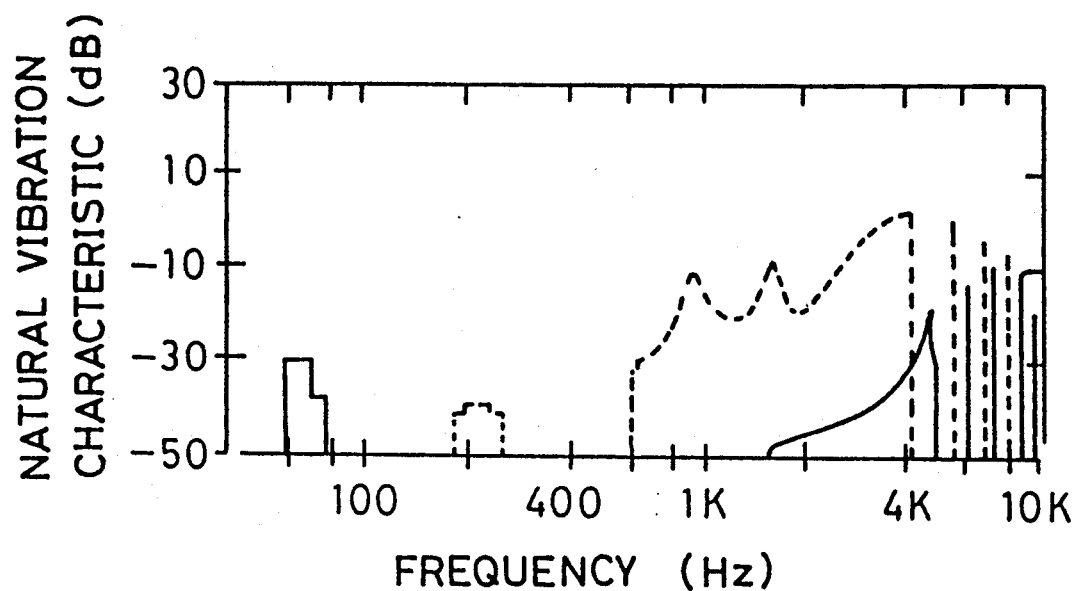
FIG. 5 is a graph showing a natural vibration characteristic of the armature according to the first preferred embodiment in comparison with the related art.
Figure 6:
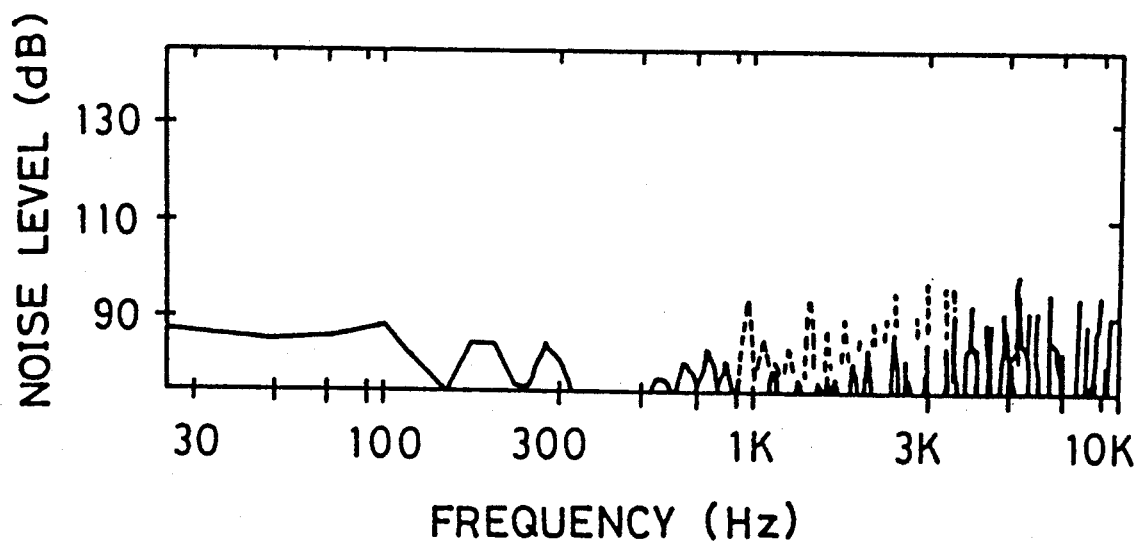
FIG. 6 is a graph showing a noise level of the fuel pump operated in fuel according to the first preferred embodiment in comparison with the related art.
Figure 15:
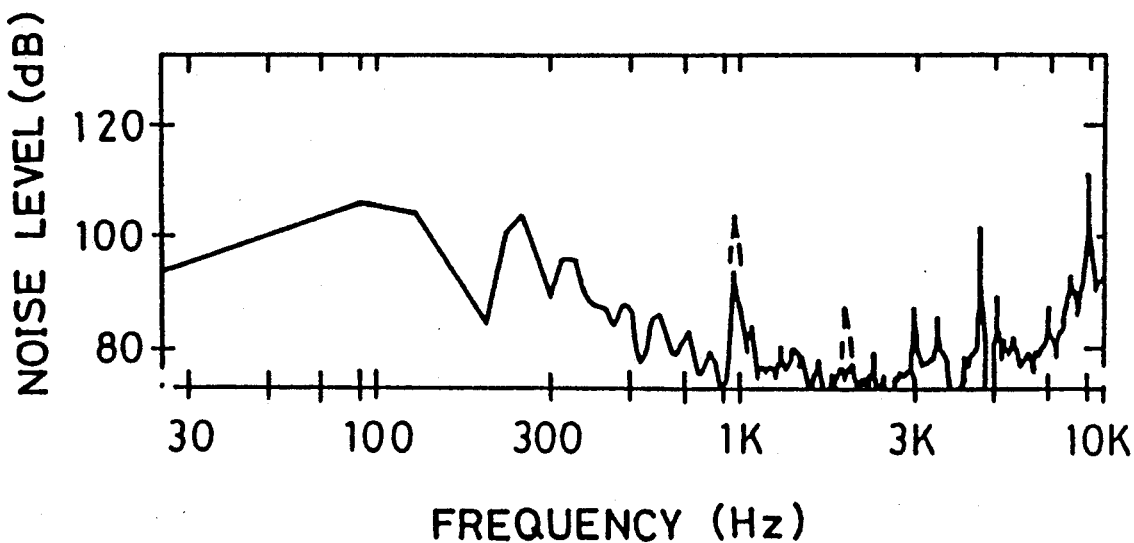
FIG. 15 is a graph showing a noise level of the fuel pump operated in fuel according to the third preferred embodiment in comparison with the related art.
Figure 18:
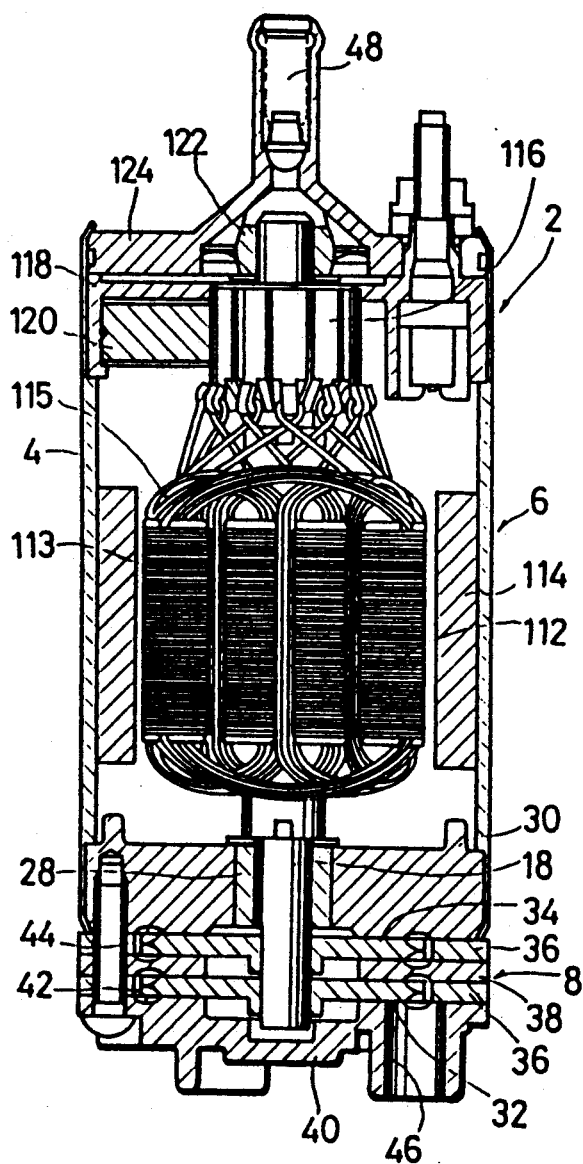
FIG. 18 is a vertical sectional view of the fuel pump having a brush motor in the related art.
Figure 19:
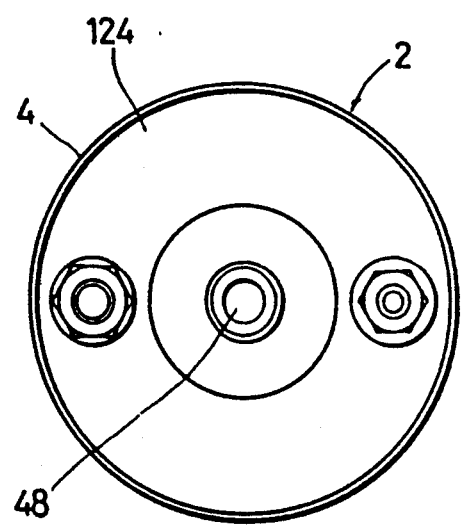
FIG. 19 is a top plan view of FIG. 18.

FIG. 5 shows a natural vibration characteristic (dB) of the armature 12 itself according to the first preferred embodiment (shown by a solid line) in comparison with the related art of FIGS. 16 and 17 (shown by a dashed line), and FIG. 15 shows a noise level (dB) of the fuel pump 2 operated in the fuel according to the first preferred embodiment (shown by a solid line) in comparison with the related art of FIGS. 18 and 19 (shown by a dashed line) under the operating condition that a rotating speed of the brushless motor 10 is set to 4,800 r.p.m. As apparent from FIGS. 5 and 6, no vibration of the armature 12 at frequencies near 1 kHz is recognized, and the noise level of the fuel pump at the frequencies near 1 kHz is accordingly reduced. Thus, the noise reduction effect of the present invention is proved.

Figure 7:
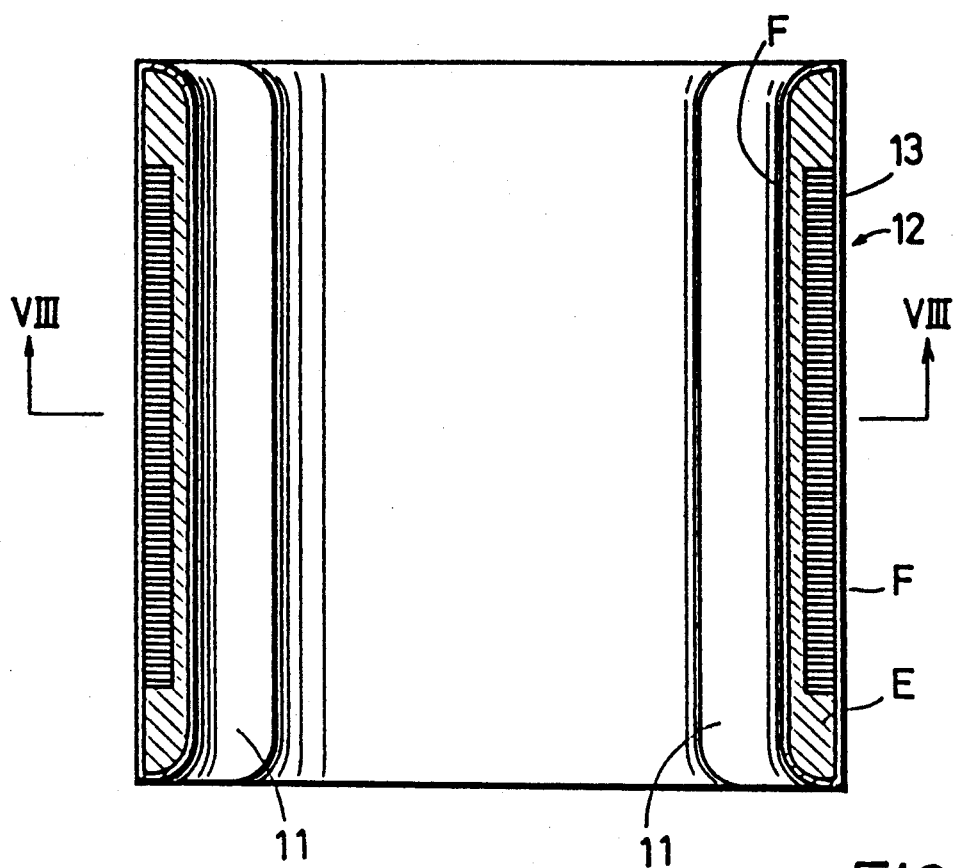
FIG. 7 is a view similar to FIG. 3, showing a second preferred embodiment of the present invention.
Figure 8:
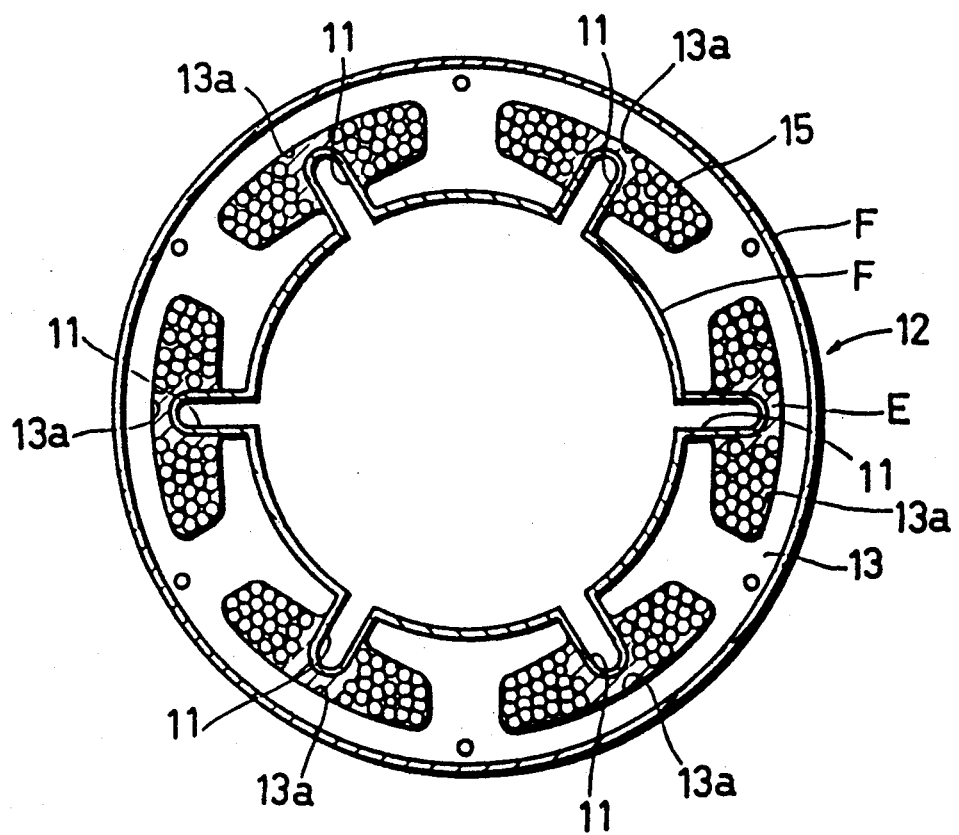
FIG. 8 is a cross section taken along the line VIII—VIII in FIG. 7.
Figure 9:
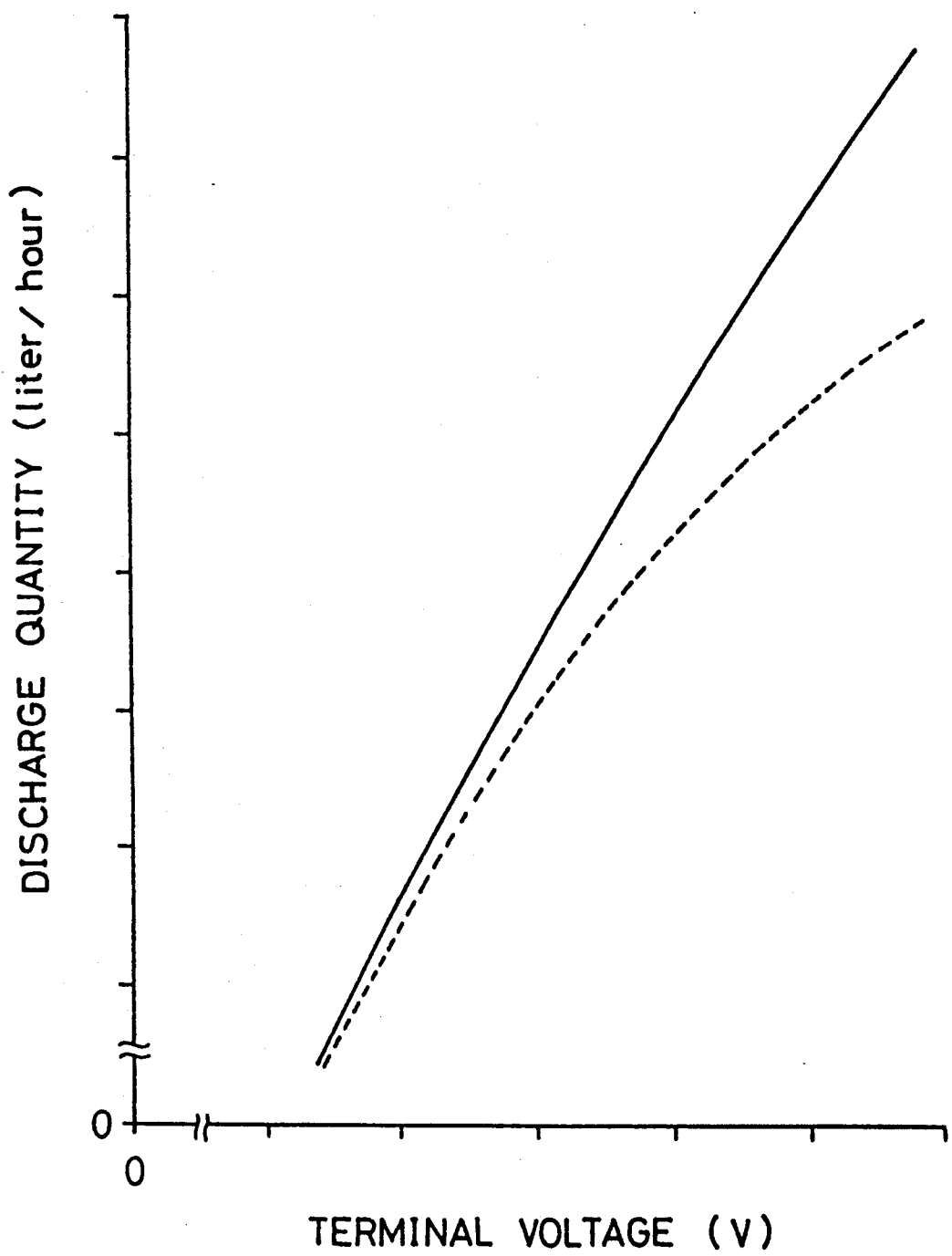
FIG. 9 is a graph showing a pump performance of the fuel pump according to the second preferred embodiment in comparison with the first preferred embodiment.
Figure 10:
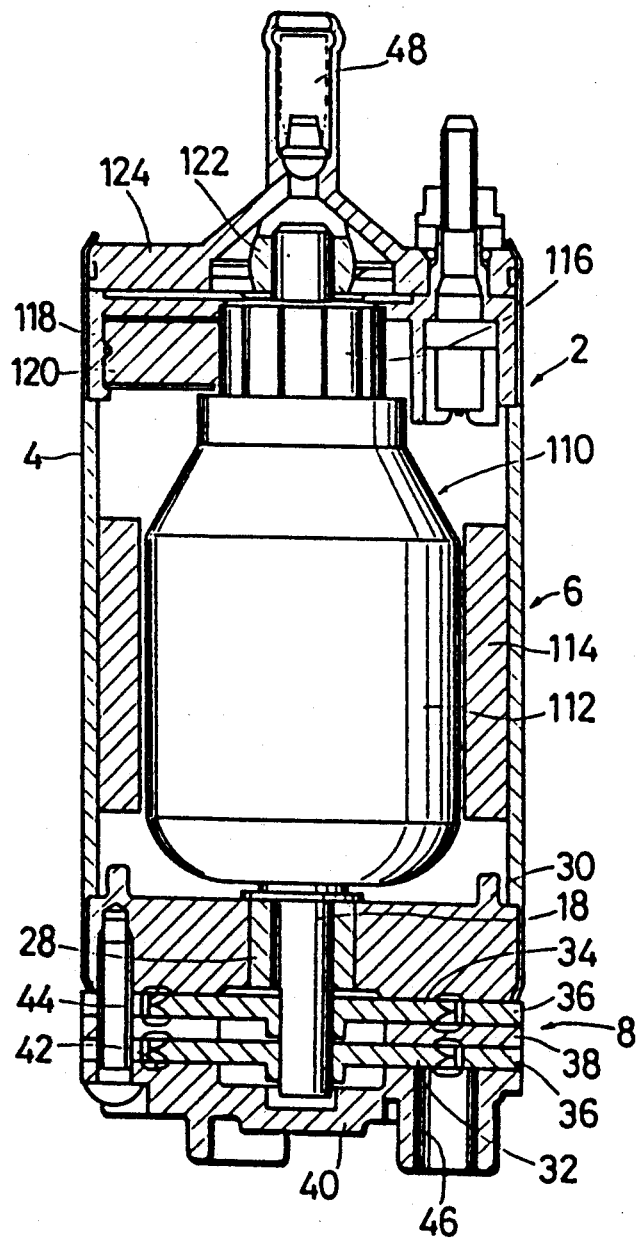
FIG. 10 is a vertical sectional view of the fuel pump according to a third preferred embodiment of the present invention.
Figure 11:
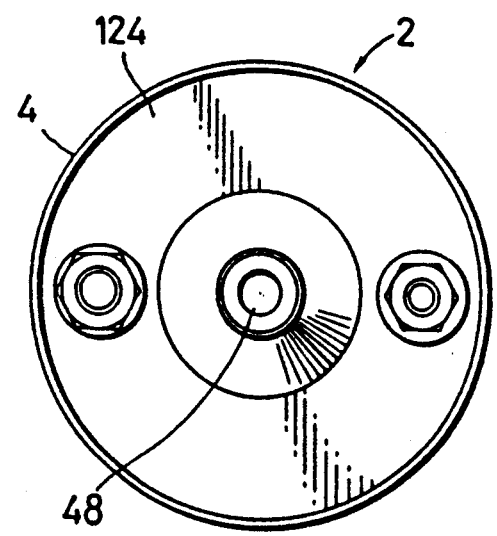
FIG. 11 is a top plan view of FIG. 10.

Referring next to FIGS. 7 to 9 which show a second preferred embodiment of the present invention, the construction of the fuel pump is the same as that of the first preferred embodiment except the construction of the armature to be hereinafter described, and the same reference numerals as those in FIGS. 1 to 4 designate the same or corresponding parts.

As shown in FIGS. 7 and 8, the core 13 is formed with a plurality of recesses 13a for receiving the coil 15, and the first resin portion E is partially filled in the recesses 13a. The second resin portion F is formed with a plurality of groove portions 11 projecting into the recesses 13a. The second resin portion F is coated on inner and outer circumferential surfaces of the core 13 and an exposed surface of the first resin portion E. The groove portions 11 extend over an axial length of the armature 12 to define another fuel passage.

With this construction, the fuel passage is defined by the groove portions 11 in addition to the fuel passage defined by the annular space between the armature 12 and the rotor magnet 14. Accordingly, even when a fuel flow rate is large, a pressure loss can be reduced to thereby improve a discharging performance of the fuel pump. Moreover, by the provision of the groove portions 11, a surface area of the armature 12 is increased to thereby improved a cooling effect by the fuel. ACcordingly, the coil 15 and the first resin portion E are efficiently cooled by the fuel and maintained always at a temperature near a temperature of the fuel. As a result, it is possible to suppress the generation of breaking of the coil 15 or cracking of the first resin portion E due to a difference in coefficient of thermal expansion at a high temperature of the coil 15 and the first resin portion E. Further, an increase in electrical resistance of the coil 15 due to heat generation in the coil 15 can also be suppressed. Therefore, the reliability of the armature 12 and the pump performance can be improved.

FIG. 9 shows the relationship between a terminal voltage and a discharge quantity as the pump performance according to the second preferred embodiment (shown by a solid line) in comparison with the first preferred embodiment (shown by a dashed line). As apparent from FIG. 9, the discharge quantity according to the second preferred embodiment is increased substantially proportional to the terminal voltage, while a rate of increase in the discharge quantity with an increase in the terminal voltage according to the first preferred embodiment is relatively low.

FIGS. 10 to 15 show a third preferred embodiment of the present invention, in which the same reference numerals as those shown in FIGS. 18 and 19 designate the same or corresponding parts, and the following description will be directed to the construction of the armature since the other construction is the same as that shown in FIGS. 18 and 19.

Figure 12:
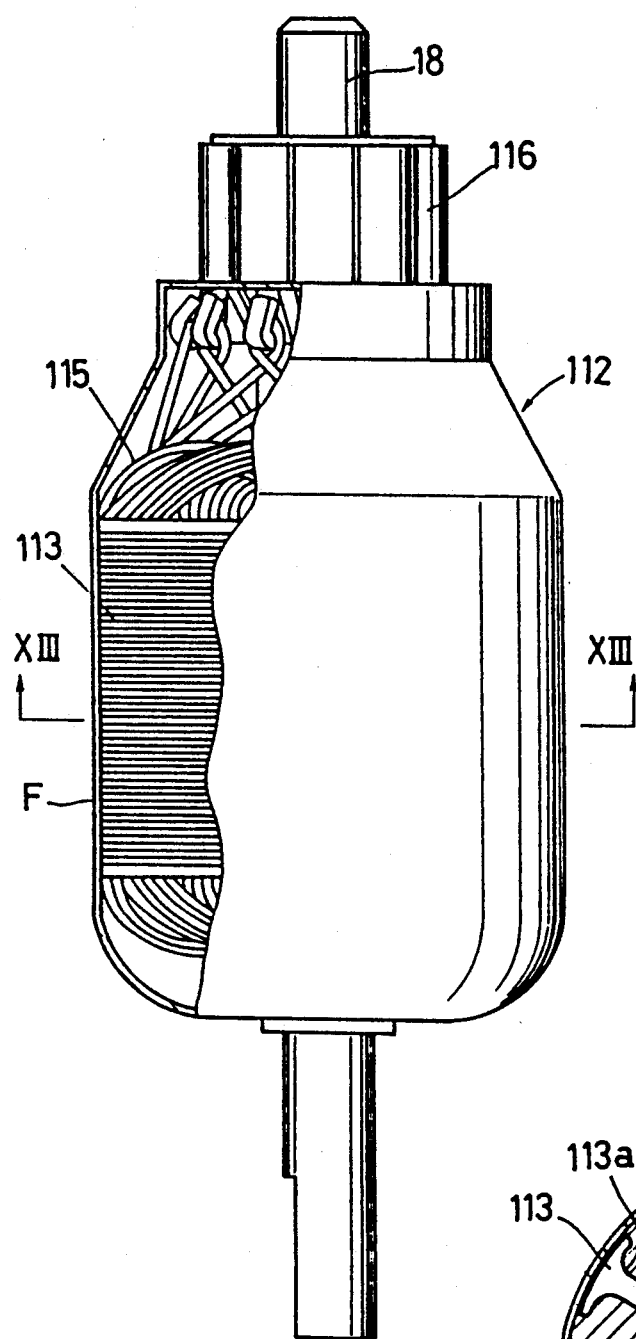
FIG. 12 is an enlarged view of the armature shown in FIG. 11, a part thereof being cut away.
Figure 13:
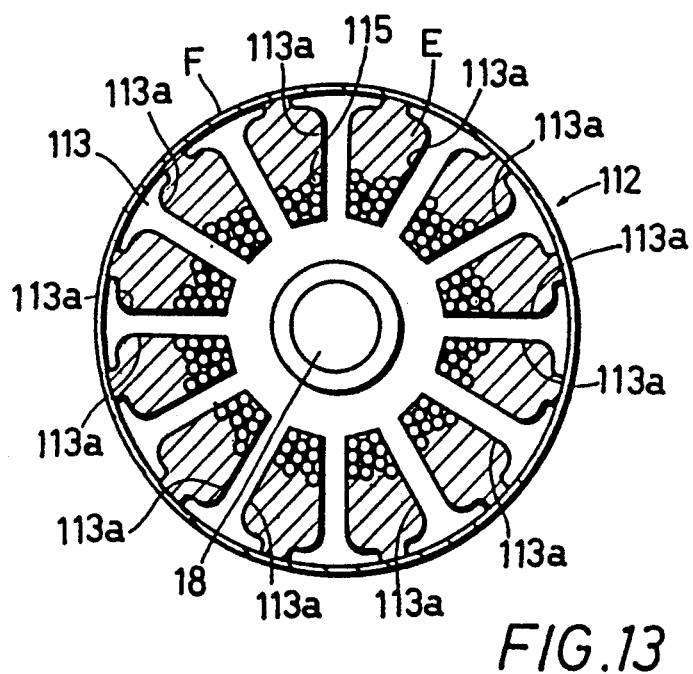
FIG. 13 is a cross section taken along the line XIII—XIII in FIG. 12.

Referring to FIGS. 10 to 13, the armature 112 of the brush motor 110 of the fuel pump 2 is constructed of the core 113 formed by stacking a plurality of plates and the coil 115 wound around the core 113. As shown in FIGS. 12 and 13, the core 113 is formed with a plurality of recesses 113a for receiving the coil 115, and the fist resin portion ER formed of epoxy resin capable of suppressing vibration of the armature 112 is impregnated in the core 113 and the coil 115 in such a manner that the first resin portion E is entirely filled in the recesses 113a. Furthermore, the second resin portion F formed of polyacetal resin having a resistance against the fuel and no influence upon the fuel is coated on the entire surface of the armature 112. Alternatively, the second resin portion F may be coated on an exposed surface of the first resin portion E only.

With this construction, a rigidity of the armature 112 is improved by the first resin portion E to thereby suppress the vibration of the armature 112 due to the sliding contact between the brush 120 and the commutator 116 or the fluctuation in electromagnetic force. As a result, a noise due to the vibration of the armature 112 is reduced. Furthermore, since the first resin portion E is entirely covered with the second resin portion F having a resistance against the fuel and no influence upon the fuel, there is no possibility that the first resin portion E will be deteriorated by the fuel flowing in the housing 4. Accordingly, a reliability of the armature 112 can be improved to lead to an improvement in reliability of the fuel pump 2.

Figure 14:
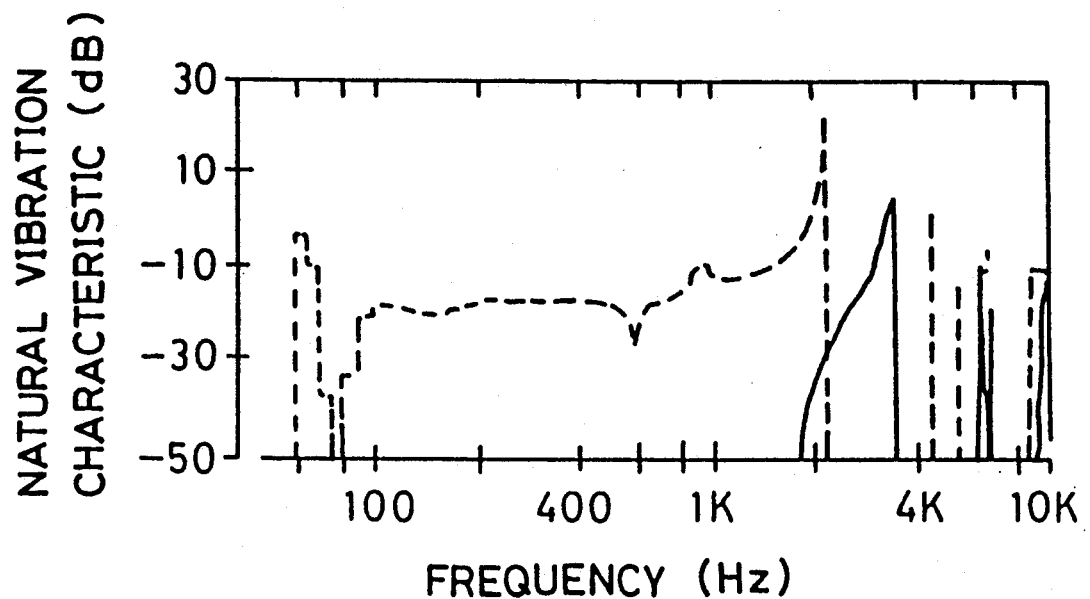
FIG. 14 is a graph showing a natural vibration characteristic of the armature according to the third preferred embodiment in comparison with the related art.

FIG. 14 shows a natural vibration characteristic (dB) of the armature 112 itself according to the third preferred embodiment (shown by a solid line) in comparison with the related art of FIGS. 18 and 19 (shown by a dashed line), and FIG. 15 shows a noise level (dB) of the fuel pump 2 operated in the fuel according to the third preferred embodiment (shown by a solid line) in comparison with the related art of FIGS. 18 and 19 (shown by a dashed line) under the operating condition that a rotating speed of the brush motor 110 is set to 4,800 r.p.m. As apparent from FIGs. 14 and 15, no vibration of the armature 112 at frequencies near 1 kHz is recognized, and the noise level of the fuel pump at the frequencies per 1 kHz is accordingly reduced. Thus, the noise reduction effect of the present invention is proved.

Having thus described the preferred embodiments of the invention, it should be understood that numerous structural modifications and adaptations may be made without departing from the spirit of the invention.

What is claimed is:

1. A fuel pump comprising:
   a housing;
   a motor section provided in said housing, said motor section comprising an armature fixed to an inner wall of said housing and a magnet rotatably supported to said housing and opposed to said armature with a substantially annular space defined therebetween as a fuel passage, said armature comprising a core formed by stacking a plurality of plates and a coil wound around said core;
   a pump section fixed to a lower end of said housing and connected to said motor section to be driven thereby;
   a fuel inlet formed in said pump section for sucking a fuel by driving said motor section;
   a fuel outlet formed at an upper end of said fuel pump for discharging the fuel fed from said fuel inlet through said fuel passage;
   a first resin portion impregnated in said core and said coil for suppressing vibration of said armature; and
   a second resin portion coated on a surface of at least said first resin portion, said second resin portion having a resistance against the fuel and no influence upon the fuel;
   wherein said core is formed with a plurality of recesses for receiving said coil, and said first resin portion is entirely filled in said recesses, and said second resin portion is coated on inner and outer circumferential surfaces of said core and an exposed surface of said first resin portion.

2. A fuel pump comprising:
   a housing;
   a motor section provided in said housing, said motor section comprising an armature fixed to an inner wall of said housing and a magnet rotatably supported to said housing and opposed to said armature with a substantially annular space defined therebetween as a fuel passage, said armature comprising a core formed by stacking a plurality of plates and a coil wound around said core;
   a pump section fixed to a lower end of said housing and connected to said motor section to be driven thereby;
   a fuel inlet formed in said pump section for sucking a fuel by driving said motor section;
   a fuel outlet formed at an upper end of said fuel pump for discharging the fuel fed from said fuel inlet through said fuel passage;

a first resin portion impregnated in said core and said coil for suppressing vibration of said armature; and a second resin portion coated on a surface of at least said first resin portion, said second resin portion having a resistance against the fuel and no influence upon the fuel;

wherein said core is formed with a plurality of recesses for receiving said coil, and said first resin portion is partially filled in said recesses, and said second resin portion is formed with a plurality of groove portions projecting into said recesses, and said second resin portion is coated on inner and outer circumferential surfaces of said core and ann exposed surface of said first resin portion, said groove portions extending over an axial length of said armature of define another fuel passage.

* * * * *